United States Patent
Gentner et al.

(10) Patent No.: US 11,179,984 B2
(45) Date of Patent: Nov. 23, 2021

(54) HOLDING DEVICE MOUNTABLE ON A TAIL REGION OF A MOTOR VEHICLE

(71) Applicant: ACPS Automotive GmbH, Markgroeningen (DE)

(72) Inventors: Wolfgang Gentner, Steinheim (DE); Bernhard Rimmelspacher, Rheinstetten (DE); Stefan Naegele, Besigheim (DE); Aleksej Kadnikov, Leonberg (DE); Francois Capron, Oberriexingen (DE)

(73) Assignee: ACPS Automotive GmbH, Markgroeningen (DE)

( * ) Notice: Subject to any disclaimer, the term of this patent is extended or adjusted under 35 U.S.C. 154(b) by 307 days.

(21) Appl. No.: 15/969,201

(22) Filed: May 2, 2018

(65) Prior Publication Data
US 2018/0319232 A1 Nov. 8, 2018

(30) Foreign Application Priority Data
May 3, 2017 (DE) ..................... 10 2017 109 488.1

(51) Int. Cl.
*B60D 1/56* (2006.01)
*B60D 1/54* (2006.01)
(Continued)

(52) U.S. Cl.
CPC ................. *B60D 1/56* (2013.01); *B60D 1/02* (2013.01); *B60D 1/485* (2013.01); *B60D 1/52* (2013.01); *B60D 1/54* (2013.01)

(58) Field of Classification Search
CPC ... B60D 1/02; B60D 1/52; B60D 1/56; B60D 1/54; B60D 1/485
(Continued)

(56) References Cited

U.S. PATENT DOCUMENTS

| | | | | |
|---|---|---|---|---|
| 4,923,205 A | * | 5/1990 | Durm ....................... | B60D 1/52 280/491.3 |
| 7,699,335 B2 | * | 4/2010 | Riehle ..................... | B60D 1/54 280/491.1 |

(Continued)

FOREIGN PATENT DOCUMENTS

| DE | 10 2016 111 158 A1 | 12/2016 | | |
|---|---|---|---|---|
| DE | 10 2015 112 741 A1 | 2/2017 | | |
| DE | 102015112741 A1 | * 2/2017 | ............... | B60D 1/06 |

*Primary Examiner* — Minnah L Seoh
*Assistant Examiner* — Felicia L. Brittman
(74) *Attorney, Agent, or Firm* — Reinhart Boerner Van Deuren P.C.

(57) ABSTRACT

In order to improve a holding device which is mountable on a tail region of the bodywork of a motor vehicle, comprising a swivel bearing unit which is mountable fixed to the vehicle on the tail region of a motor vehicle, in particular a passenger motor vehicle, by means of a support unit, on which swivel bearing a swivel element supporting an attachment element is mounted pivotable about a swivel axis extending transversely, in particular inclined, relative to a longitudinal central plane and is thereby pivotable from an operating position into a rest position and vice versa, such that a holding device is provided to which widely differing attachment elements are fixable, it is proposed that the swivel element is provided with an attachment element carrier having a plug-in receptacle, into which attachment element carrier an attachment element is pluggable with an end region and is fixable with positive engagement, and in that in the operating position, the plug-in receptacle extends with its central axis substantially parallel to the longitudinal central plane and, in the rest position, extends with its central axis transversely to the longitudinal central plane.

32 Claims, 15 Drawing Sheets

(51) Int. Cl.
    *B60D 1/52*     (2006.01)
    *B60D 1/48*     (2006.01)
    *B60D 1/02*     (2006.01)

(58) Field of Classification Search
    USPC .................................................. 280/491.5
    See application file for complete search history.

(56) References Cited

U.S. PATENT DOCUMENTS

| | | | |
|---|---|---|---|
| 9,744,822 B2 * | 8/2017 | Burkhardt | B60D 1/06 |
| 2004/0113391 A1 * | 6/2004 | Aufderheide | B60D 1/54 |
| | | | 280/491.1 |
| 2005/0167946 A1 * | 8/2005 | Rampp | B60D 1/54 |
| | | | 280/491.1 |
| 2010/0270774 A1 * | 10/2010 | Boberg | B60D 1/54 |
| | | | 280/479.3 |
| 2012/0119469 A1 | 5/2012 | McConnell | |

* cited by examiner

HOLDING DEVICE MOUNTABLE ON A TAIL REGION OF A MOTOR VEHICLE

CROSS-REFERENCE TO RELATED PATENT APPLICATION

This patent application claims the benefit of German application No. 10 2017 109 488.1, filed May 3, 2017, the teachings and disclosure of which are hereby incorporated in their entirety by reference thereto.

BACKGROUND OF THE INVENTION

The invention relates to a holding device which is mountable on a tail region of a motor vehicle, comprising a swivel bearing unit which is mountable fixed to the vehicle on the tail region of a motor vehicle, in particular a passenger motor vehicle, by means of a support unit, on which swivel bearing unit a swivel element supporting an attachment element is mounted pivotable about a swivel axis extending transversely, in particular inclined, relative to a longitudinal central plane and is thereby pivotable from an operating position into a rest position.

Such holding devices are known as trailer couplings in which a ball neck is pivotable between an operating position and a rest position.

Proceeding from a holding device of this type, it is an object of the invention to provide a holding device to which widely differing attachment elements are fixable.

SUMMARY OF THE INVENTION

This object is achieved in a holding device of the type described in the introduction in that the swivel element is provided with an attachment element carrier having a plug-in receptacle, into which plug-in receptacle an attachment element is pluggable with an end region and is fixable with positive engagement, and in that in the operating position, the plug-in receptacle extends with its central axis substantially parallel to the longitudinal central plane and in the rest position extends with a central axis transversely to the longitudinal central plane.

The advantage of the solution according to the invention is therefore to be found in that the possibility thus exists, firstly of making the attachment element carrier accessible for use with the plug-in receptacle in the operating position and, secondly when not in use, of moving it into the rest position in which the attachment element carrier is arranged outside a visible region of the bodywork, in particular covered by a bumper unit.

With regard to the configuration of the attachment element carrier, no further details have so far been given.

An advantageous solution thus provides that the attachment element carrier comprises a receptacle body which has the plug-in receptacle wherein, in particular, the plug-in receptacle is formed in the receptacle body.

With regard to the connection between the receptacle body and the swivel element, no further details have so far been given.

A particularly advantageous solution thus provides that the receptacle body is connected by means of a connecting arm to the swivel element.

This solution has the advantage that by means of suitable shaping of the connecting arm, the arrangement of the receptacle body relative to the swivel element can be adapted to the respective installation situation.

With regard to the connection between the connecting arm and the receptacle body, it is advantageous if the connecting arm is provided with a holding seat which is connected to the receptacle body.

The holding seat thus provides a preferred connection of the receptacle body to the connecting arm.

In particular, the receptacle body is welded onto the holding seat.

In order to create an optimum connection between the holding seat and the receptacle body, it is preferably provided that the holding seat abuts the receptacle body with a front face.

Preferably, the front face is welded to an end side of the receptacle body.

It is also preferably provided that the holding seat has a support finger which abuts an outer face of the receptacle body and which is connected to the receptacle body, in particular is welded thereto.

A particularly preferred solution provides that the holding seat is configured as a single-piece part which has, on one side, the front face and, on the other side, the support finger and thus establishes the possibility of connecting the receptacle body with the necessary stability to the connecting arm.

It is particularly advantageous if the holding seat is formed integrally onto the connecting arm, so that a stable connection exists between the connecting arm and the holding seat.

In order also to be able to create in a simple manner an electrical connection to a system held on the holding device by means of the attachment element, it is preferably provided that the attachment element carrier is provided with a plug-in connector holder to receive a plug-in connector unit.

The plug-in connector holder can be arranged at widely differing sites of the attachment element carrier.

An advantageous solution provides that the plug-in connector holder is arranged on the receptacle body and, in particular thereby, in the operating position, lies behind the bumper unit and thus a readily accessible arrangement of the plug-in connector unit is possible.

The plug-in connector holder can be arranged at different sides of the receptacle body.

A further advantageous possibility of the arrangement of the plug-in connector unit provides that the plug-in connector holder is arranged at the connecting arm, for example, in order to protect from damage the plug-in connector unit to be mounted.

A further advantageous solution provides that the plug-in connector holder is integrated into the attachment element carrier.

The integrated installation can take place either in the region of the receptacle body or in the region of the connecting arm.

The plug-in connector unit to be built in can thus be protected particularly well.

Preferably, it is herein provided that, in the operating position of the attachment element carrier, the plug-in connector holder is arranged on a side of the attachment element carrier not facing toward the roadway in order to prevent damage to the plug-in connector holder or the plug-in connector unit held thereby.

In particular, it is favourable if, in the operating position, the plug-in connector holder is arranged on a side of the attachment element carrier facing away from the roadway.

It is particularly advantageous if, in the rest position, the plug-in connector holder is arranged facing toward the roadway and, in the operating position, the plug-in connector holder is arranged facing away from the roadway.

Furthermore, it is advantageous particularly for securing a system connected to the attachment element if at least one securing eye is arranged on the attachment element carrier.

Such a securing eye which is arranged directly on the attachment element carrier thus forms an optimum protection of the system against a removal from the holding device.

It is particularly favourable thereby if the securing eye is connected to the attachment element carrier by means of a mounting element in order to fix it in a simple manner to the receptacle body.

Preferably, it is herein provided that the mounting element is held on an outer face of the attachment element carrier and is firmly connected, for example welded, thereto.

A particularly preferred solution provides that the mounting element is arranged on an outer face of the attachment element carrier extending, in the operating position of the attachment element carrier, approximately parallel to the vehicle longitudinal central plane.

In order to be able to carry out a pivoting of the attachment element carrier from the operating position into the rest position or vice versa with the greatest possible space saving, it is advantageous, in particular with large securing eyes, if the securing eyes are connected in articulated manner to the attachment element carrier.

A simple solution herein provides that the securing eyes are pivotable about a single axis extending approximately parallel to the longitudinal central plane.

With regard to the support unit for the holding device according to the invention, no further details have so far been given.

An advantageous solution thus provides that the support unit has a transverse support extending transversely to the vehicle longitudinal central plane which is connected to the tail region of the bodywork and supports the swivel bearing unit in a central region.

In particular, with this solution, the receptacle body can be positioned in the rest position so that it lies on a side of the transverse support facing toward the roadway.

Furthermore, the solution according to the invention of the object relates to a motor vehicle with a bodywork in which a holding device according to one or more of the above features is arranged, according to the invention, on the tail region.

In particular, it is provided in a motor vehicle of this type that arranged on the tail region is a rear end bumper unit which overlaps the support unit and, in particular, hides it from view, so that the support unit is not visible to a person observing the motor vehicle.

It is preferably further provided in a motor vehicle of this type that, in the operating position, the attachment element carrier is arranged on a side facing toward a roadway of a lower edge of the bumper unit of the motor vehicle and thus the plug-in receptacle is easily accessible for a user of the motor vehicle.

Furthermore, it is preferably provided that, in the rest position, the attachment element carrier is arranged on a side of the lower edge of the bumper unit facing away from a roadway and thereby in particular, the bumper unit hides the receptacle body from view.

Also with regard to the arrangement of the plug-in connector holder with the plug-in connector, it is preferably provided that, in the rest position, the plug-in connector holder with the plug-in connector unit is arranged on a side of the lower edge of the bumper unit facing away from the roadway and thereby, in particular, is hidden from view by the bumper unit.

Preferably, in the rest position, the plug-in connector holder with the plug-in connector unit lies between the transverse support and the lower edge of the bumper unit.

With respect to the attachment elements connectable to the device, no further details have so far been given.

An advantageous solution thus provides that the attachment element is a coupling ball carrier with a coupling ball, wherein an end region of the coupling ball carrier is insertable into the plug-in receptacle and is fixable therein with positive engagement.

The solution according to the invention has the advantage in the case of a coupling ball carrier with a coupling ball that the possibility exists therewith of inserting different coupling ball carriers, for example, with different couplings as the attachment element and fixing them in the plug-in receptacle.

Another advantageous solution provides that the attachment element is a plug-in element which supports a load carrier, for example a bicycle carrier or a ski carrier and connects it to the holding device.

Further features and advantages of the solution according to the invention are the subject matter of the following description and of the illustration in the drawings of an exemplary embodiment.

DETAILED DESCRIPTION OF THE INVENTION

Figure 1:
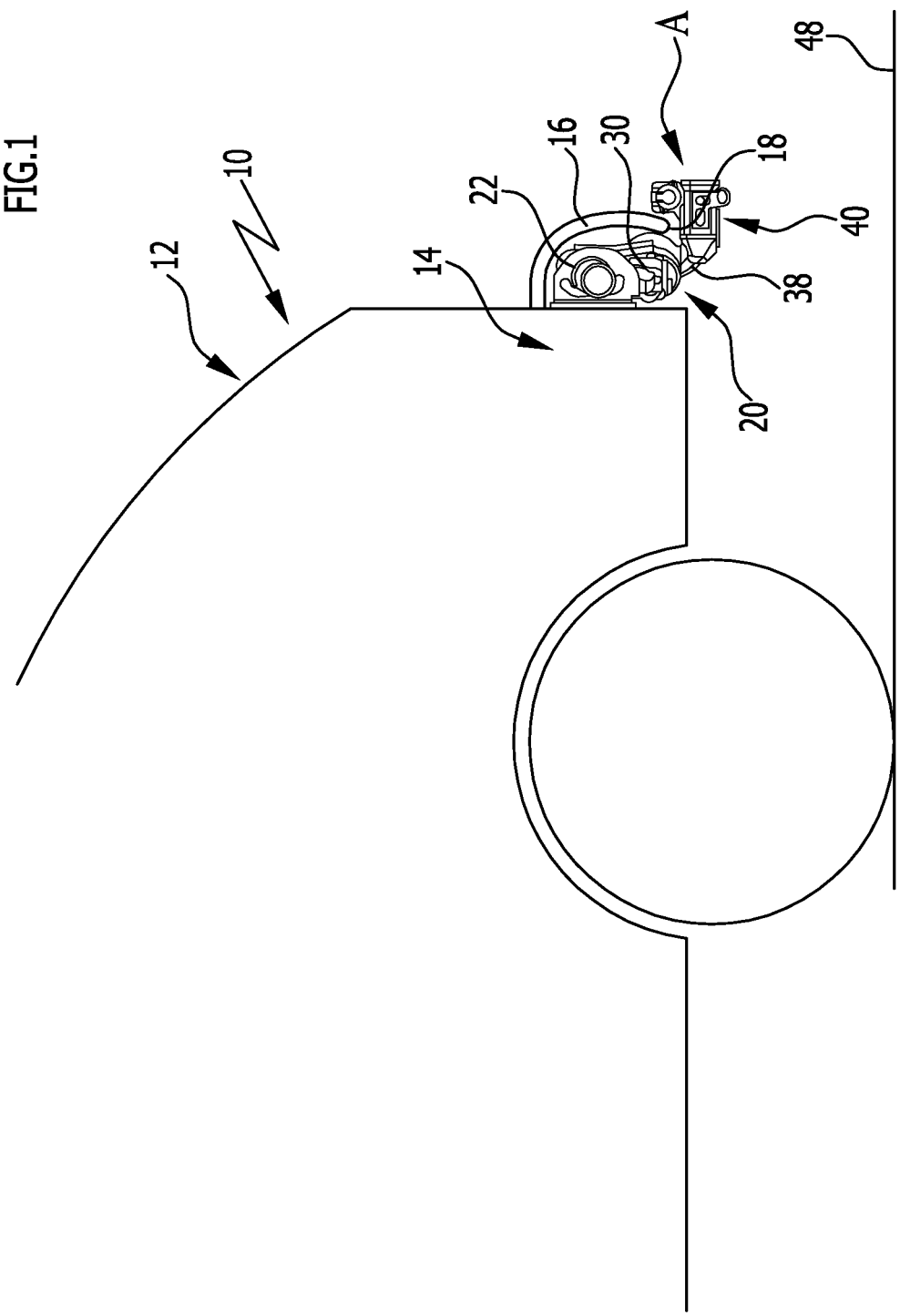
FIG. 1 shows a schematic side view of a motor vehicle with a bodywork and a partially laterally removed bumper unit and a holding device according to the invention in an operating position.

An exemplary embodiment of a motor vehicle 10 according to the invention shown in FIG. 1 comprises a bodywork 12 which carries a rear end bumper unit 16 on a tail region 14.

Figure 2:
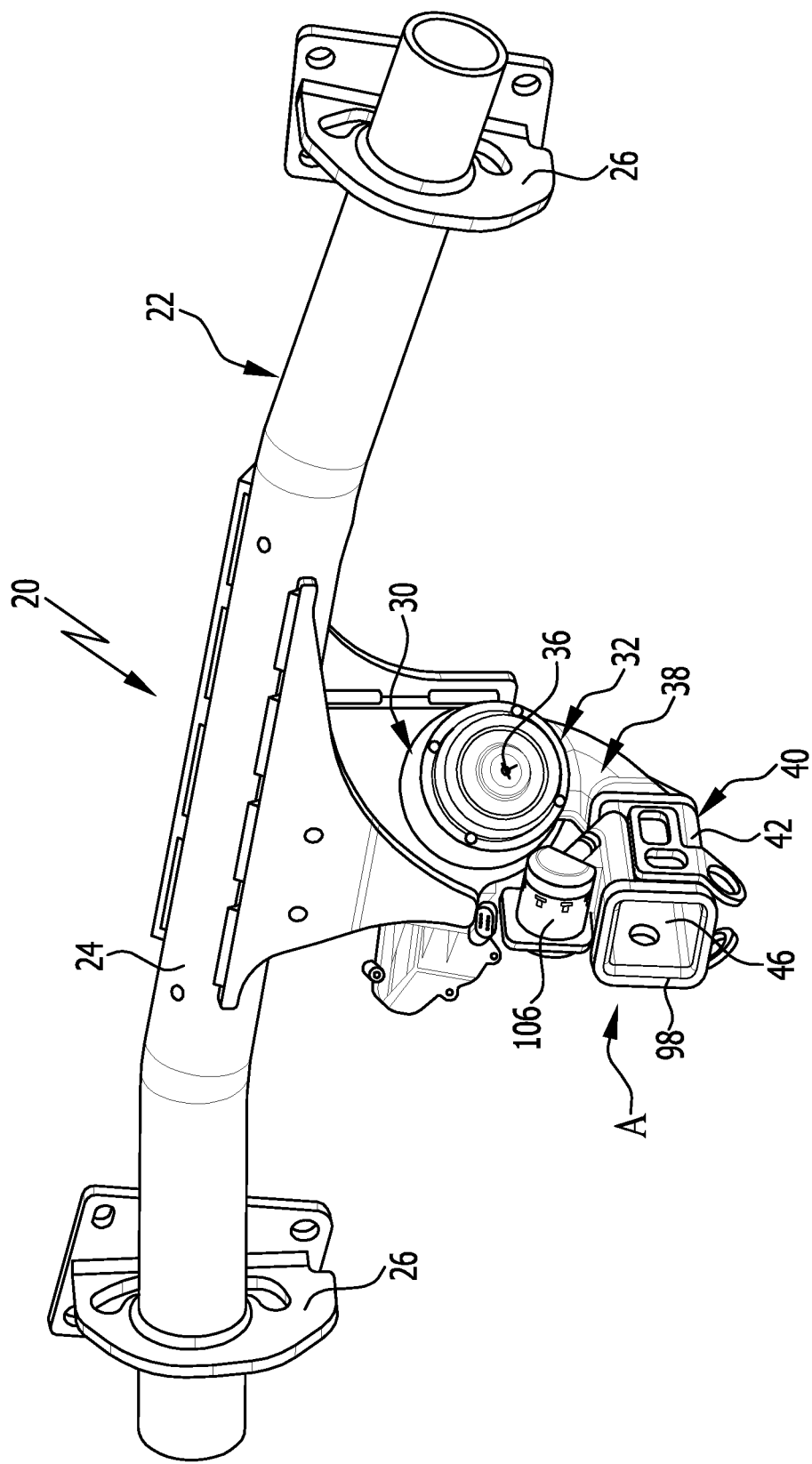
FIG. 2 shows a perspective view of a first exemplary embodiment of the holding device according to the invention in the operating position.

Furthermore, arranged on the tail region is a first exemplary embodiment of a holding device identified as a whole as 20, which comprises a support unit 22 which is arranged under the bumper unit 16 and hidden thereby which, as shown in FIG. 2, has a transverse support 24 which is connected by means of lateral connecting elements 26 to the tail region 14.

Figure 3:
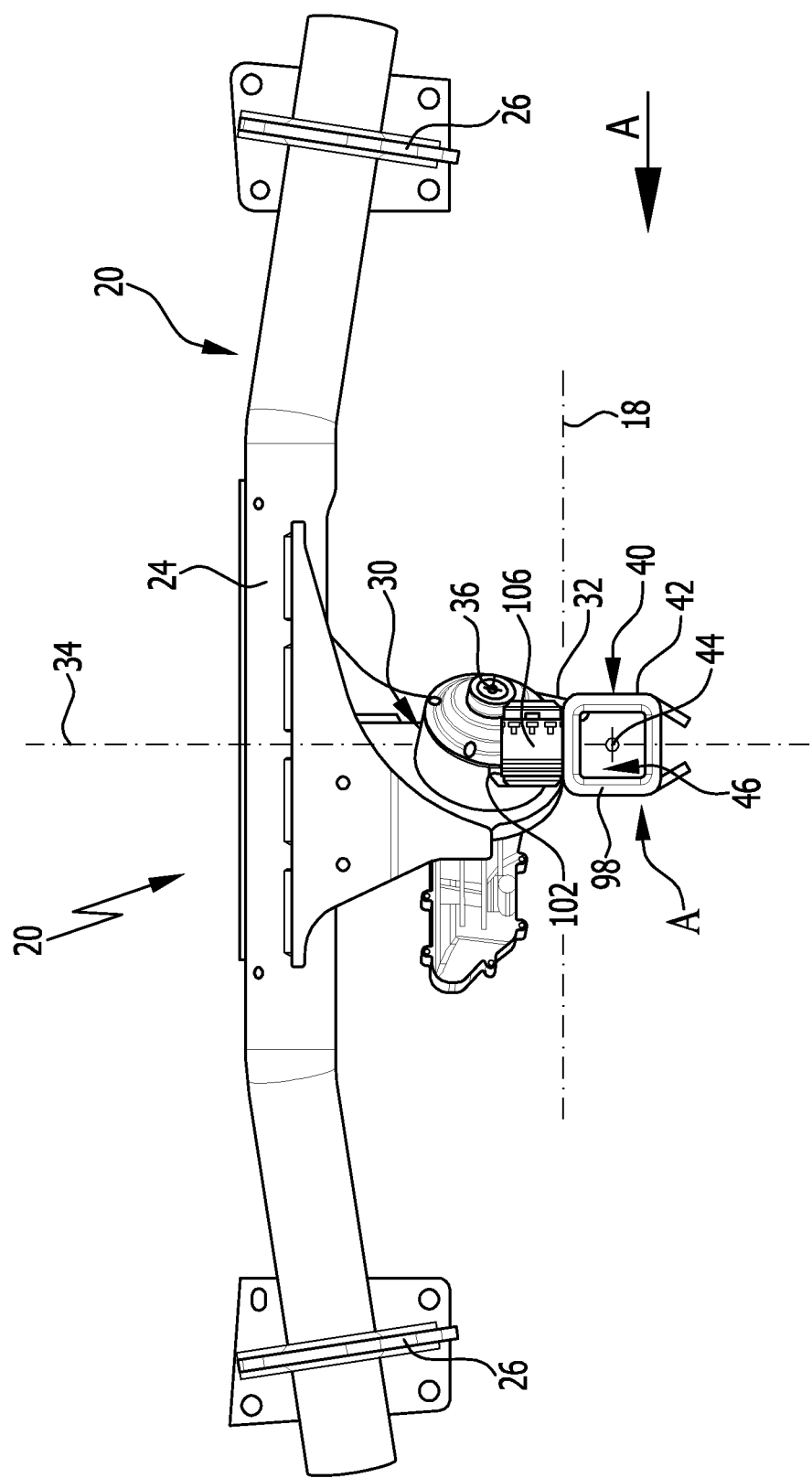
FIG. 3 shows a plan view of the first exemplary embodiment of the holding device according to the invention in the operating position viewed in the driving direction and with the lower edge of the bumper unit indicated.

Furthermore, held on the support unit 22, in particular in a central region of the transverse support 24, is a swivel bearing unit identified as a whole as 30, on which a swivel element 32 is mounted pivotable about a swivel axis 36 extending transversely to a vehicle longitudinal central plane 34 of the bodywork 12, which is simultaneously also a longitudinal central plane 34 of the holding device 20 (FIGS. 2, 3).

Figure 4:
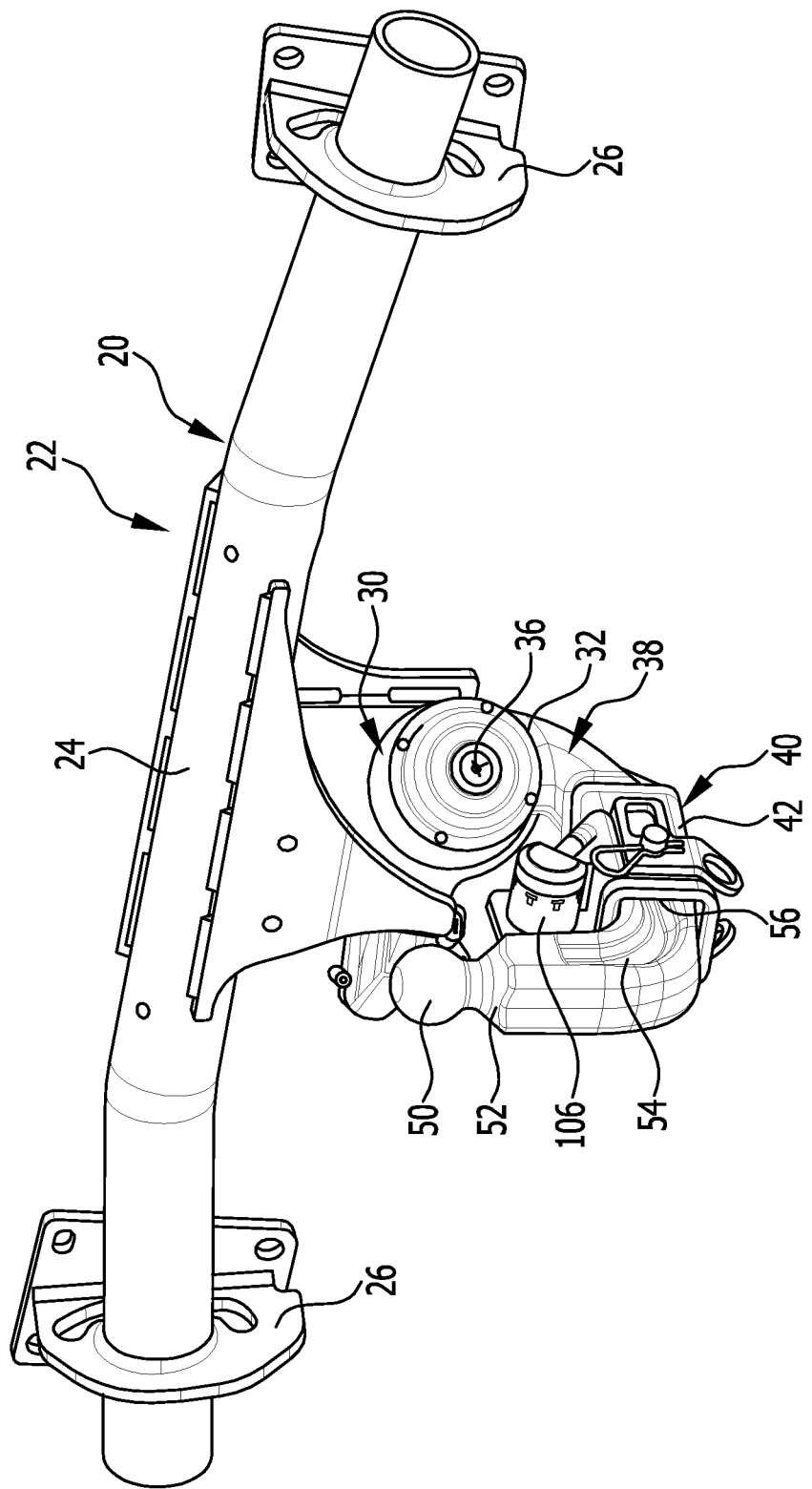
FIG. 4 shows a perspective representation of the first exemplary embodiment of the holding device similar to FIG. 2 with an attachment element, in this case a coupling ball carrier with a coupling ball, inserted into a plug-in receptacle.
Figure 5:
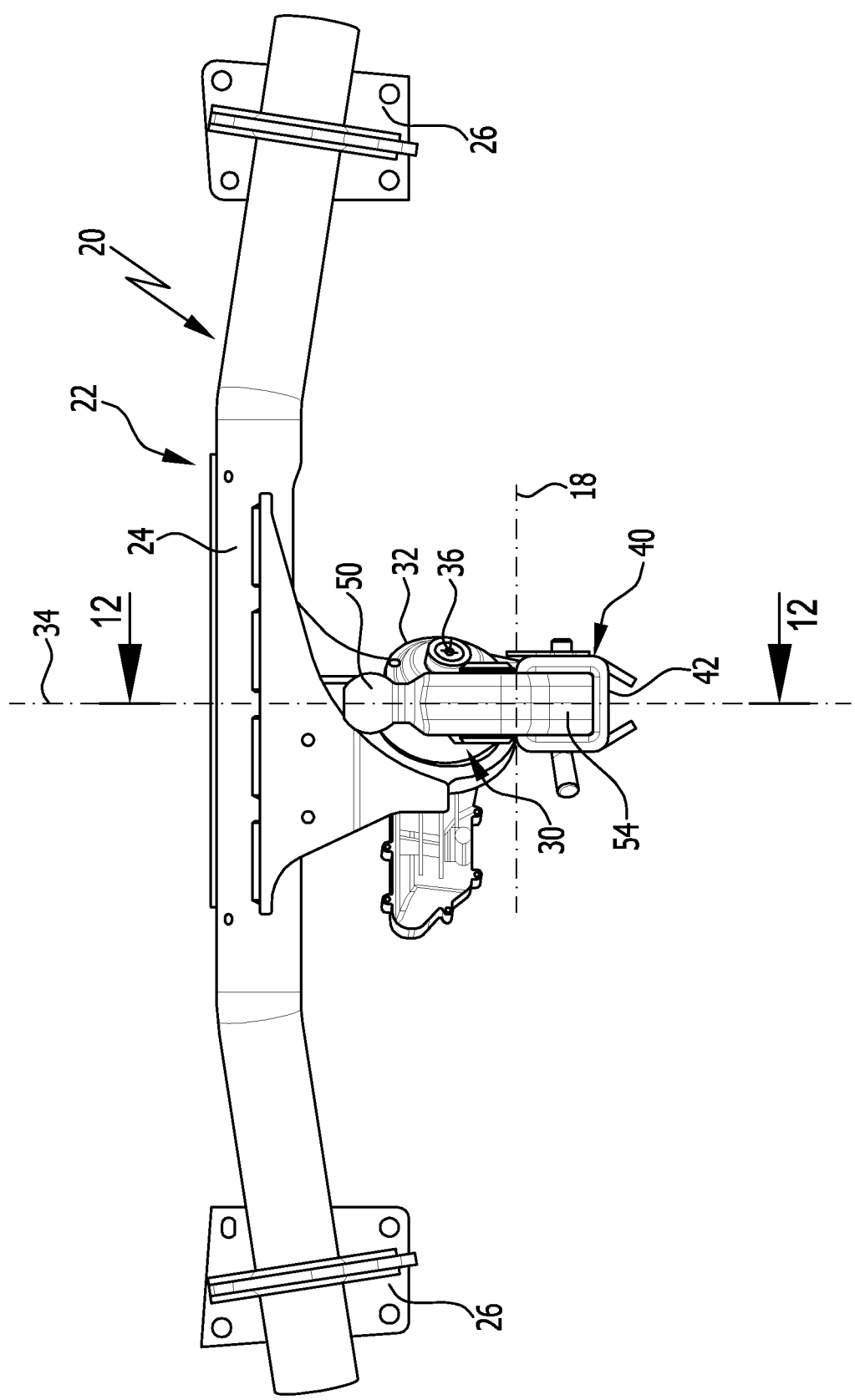
FIG. 5 shows a perspective representation of the first exemplary embodiment of the holding device similar to FIG. 3 with an attachment element, in this case a coupling ball carrier with a coupling ball, inserted into the plug-in receptacle.
Figure 6:
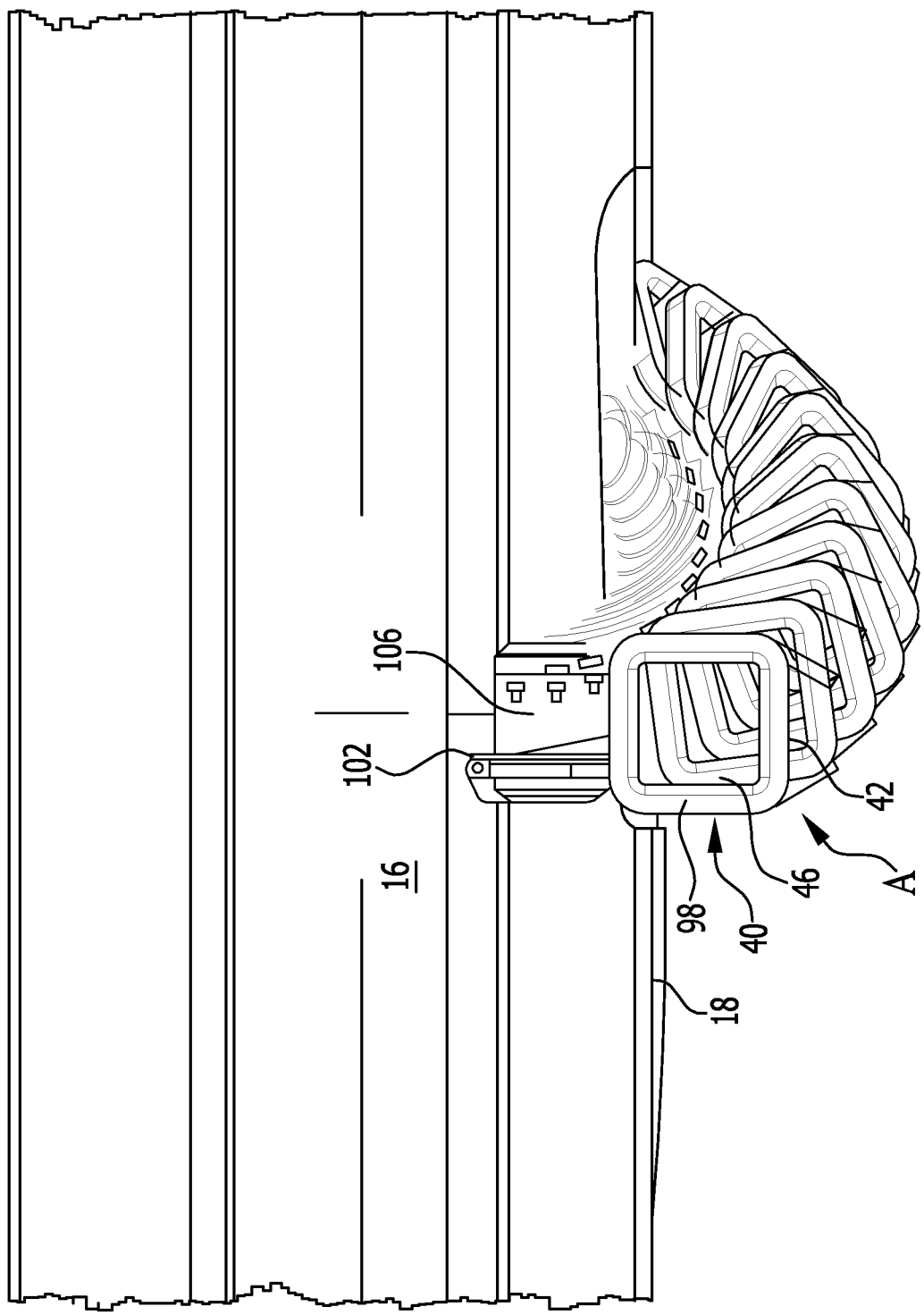
FIG. 6 shows a plan view of the first exemplary embodiment of the according to the invention holding device similar to FIG. 3, mounted on the tail region of the bodywork with a representation of the relative arrangement of the receptacle body with a plug-in connector holder and a plug-in connector unit in the operating position and on a pivot movement away from the operating position in the direction of a rest position, which is not shown since it is hidden by the bumper unit.

Extending outwardly from the swivel element 32 is an attachment element carrier 40 which comprises a connecting arm 38 starting from the swivel element 32, to which connecting arm is connected a receptacle body, identified as a whole as 42, which forms a plug-in receptacle 46 extending therein along a central axis 44, into which as shown in FIGS. 4 and 5, for example as an attachment element, a coupling ball carrier 54 carrying a coupling ball 50 at one end 52 is insertable with an end region 56 positioned opposite the end 52.

As shown in FIG. 1, in an operating position A, the attachment element carrier 40 is arranged relative to the bumper unit 16 such that it lies beneath a lower edge 18 of the bumper unit 16, that is, on a side thereof facing toward a roadway 48 and thus the plug-in receptacle 46 is freely accessible for the insertion of the end region 56 of the coupling ball carrier 54, wherein the central axis 44 extends in the vehicle longitudinal central plane or the longitudinal central plane of the holding device 34.

Figure 7:
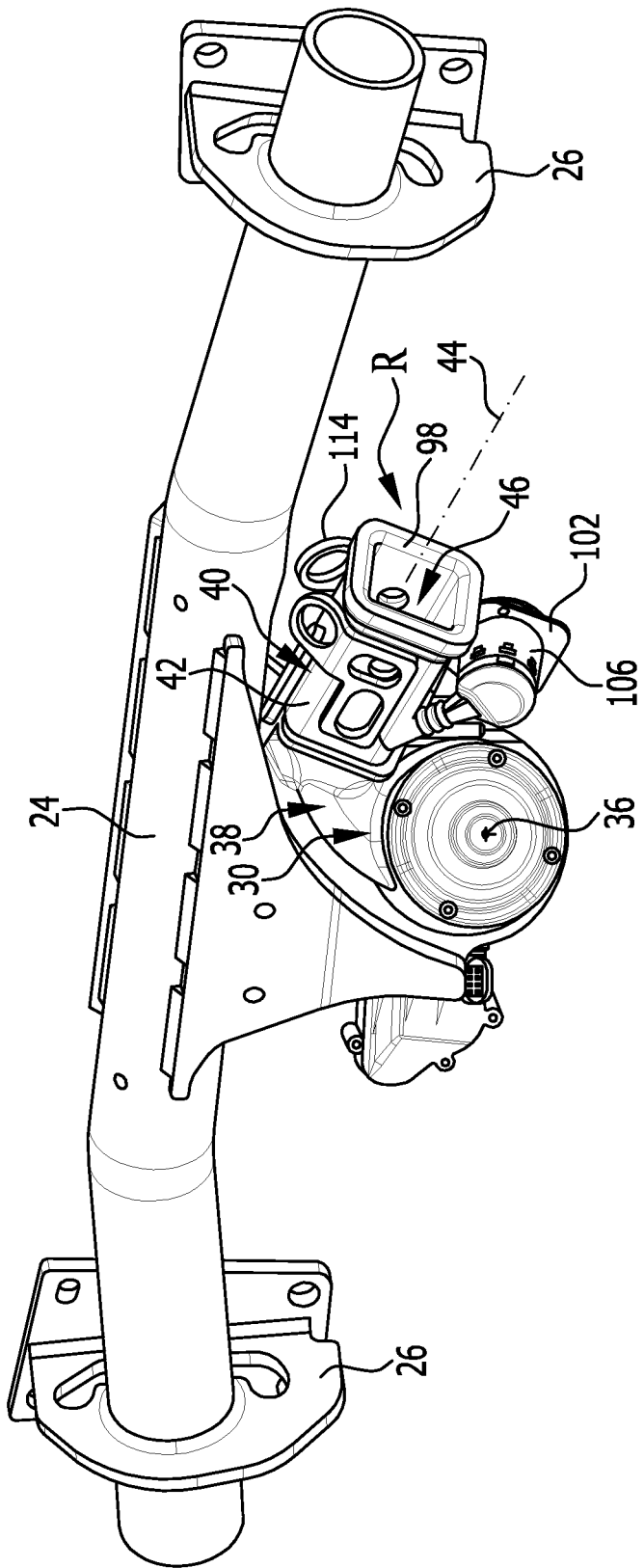
FIG. 7 shows a representation of the first exemplary embodiment of the holding device according to FIG. 2, in the rest position.
Figure 8:
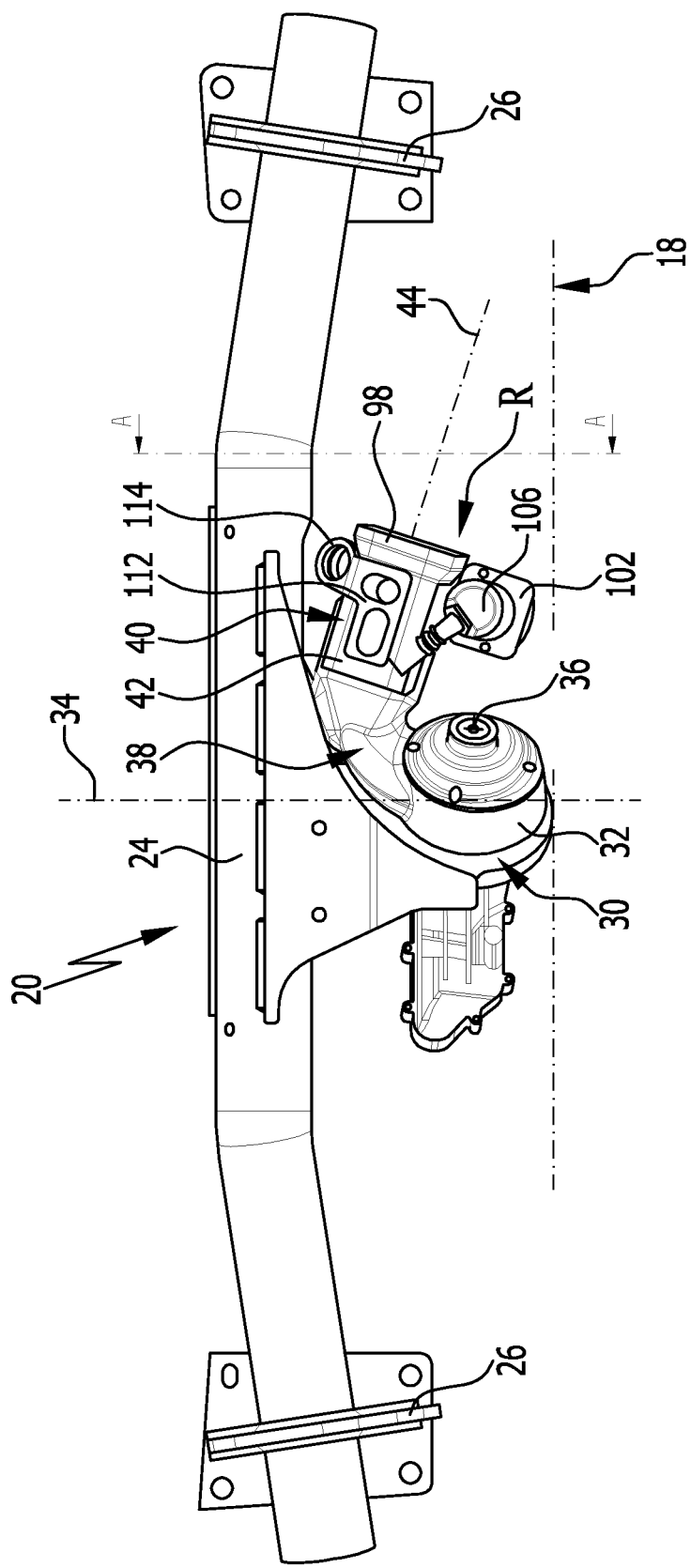
FIG. 8 shows a representation of the first exemplary embodiment of the holding device according to FIG. 3, in the rest position.

By means of the mounting of the swivel element 32 pivotable about the swivel axis 36, the possibility exists, as shown in FIGS. 1 to 3 and 6 to 8, of pivoting the attachment element carrier 40 from the operating position A in which the receptacle body 42 is arranged beneath the lower edge 18 of the bumper unit 16, under the lower edge 18 through into a rest position R shown in FIGS. 7 and 8, in which the attachment element carrier 40 and thus in particular also the receptacle body 42 lies covered by the bumper unit 16 above the lower edge 18 of the bumper unit 16 and thus outside a visible region of the bumper unit 16 and the bodywork 12, wherein the central axis 44 extends transversely to the vehicle longitudinal central plane 34 or the longitudinal central plane of the holding device 20.

Figure 9:
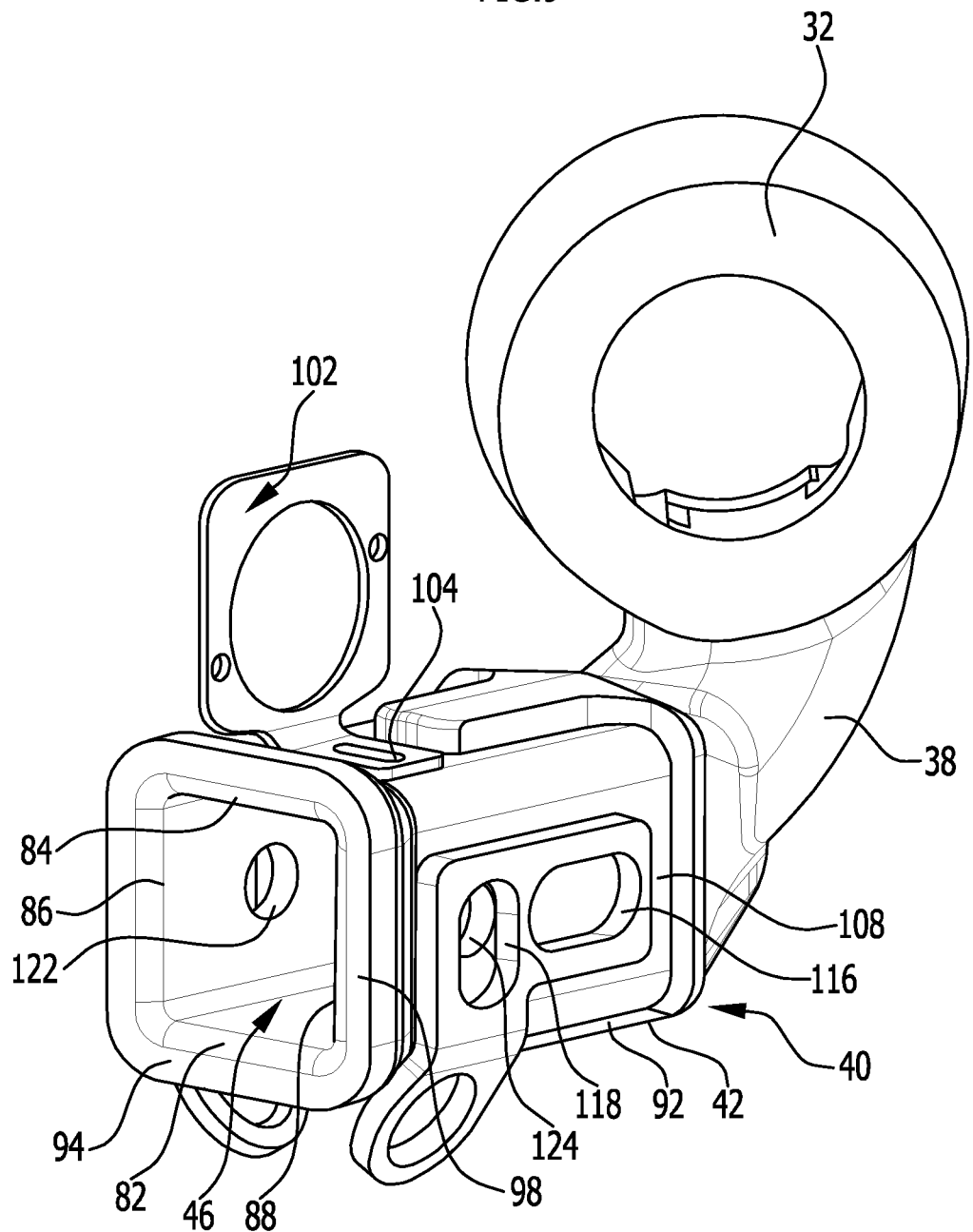
FIG. 9 shows a perspective representation of the swivel element of the first exemplary embodiment with the connecting arm and the receptacle body.
Figure 10:
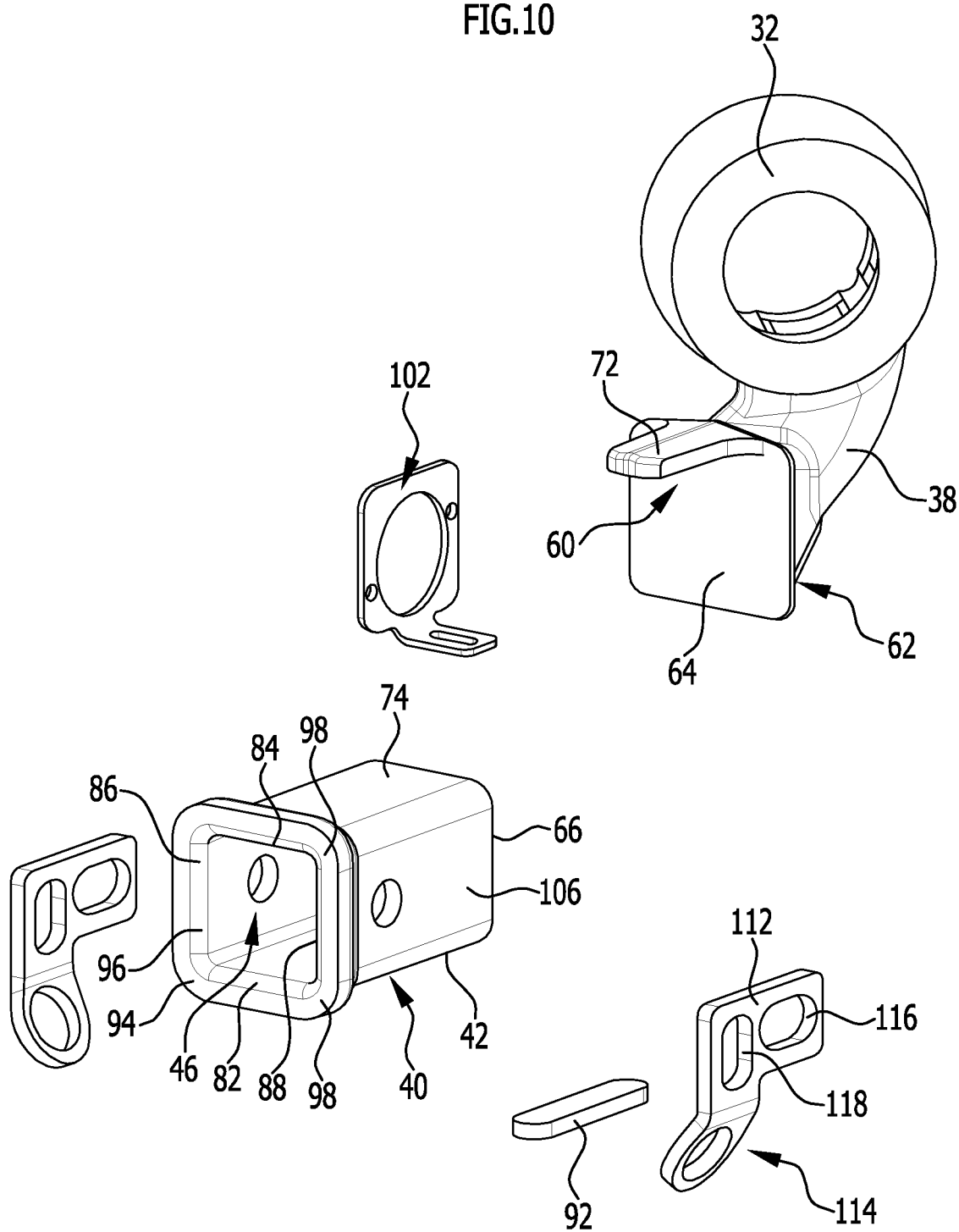
FIG. 10 shows an exploded representation of the swivel element of the first exemplary embodiment with the connecting arm, the plug-in receptacle and the receptacle body.

As shown in FIGS. 9 and 10, arranged on the connecting arm 38 which extends from the swivel element 32 is a holding seat identified as a whole as 60, formed on in particular integrally, which has a seat base 62 which is provided with a front face 64 which the receptacle body 42 abuts with an end side 66 and is supported with this end side 66 on the front face 64 of the seat base 62.

The holding seat 60 further comprises a support finger 72 which starts from the seat base 62 and which is arranged laterally of the front face 64 and which, with the receptacle body 42 supported with the end side 66 on the front face 64 of the seat base 62, abuts on an outer face 74 of the receptacle body 42.

Preferably, the receptacle body 42 is formed in cross-section as a rectangular sleeve which comprises sleeve walls 82, 84, 86, 88 delimiting the plug-in receptacle 46 on four sides, wherein the sleeve walls 82 and 84 lie opposite one another and the sleeve walls 86 and 88 also lie opposite one another.

Preferably, in the operating position A of the receptacle body 42, the sleeve wall 82 is a lower sleeve wall 82 facing toward a roadway surface 48 and the sleeve wall 84 is an upper sleeve wall facing away from the roadway 48 and, for example, carries the outer face 74 which abuts the support finger 72.

Then, extending laterally between the lower sleeve wall 82 and the upper sleeve wall 84 are the sleeve walls 86 and 88 which therefore represent lateral sleeve walls.

The receptacle body 42 abutting the holding seat 60 with the end side 66 and the side face 74 in the region of the front face 64 and of the support finger 72 of the holding seat 60 is preferably welded to the holding seat 60, wherein by means of weld seams, a connection takes place between the seat base 62 and the side walls 82, 84, 86, 88 in the region of the end side 66 and a connection takes place between the support finger 72 and the upper sleeve wall 84 in the region of the outer face 74.

For further stabilisation of the connection between the holding seat 60 and the receptacle body 42, there ensues also a welding of a support element 92, on one side, to an outer face of the lower sleeve wall 82 and, on the other side, to the seat base 62.

The receptacle body 42 is further provided on its end side 94 opposite the end side 66, which surrounds a plug-in opening 96 for the end region 56, with a reinforcing bead 98.

For mounting of an electrical plug-in connector which is pivotable with the receptacle body 42, a plug-in connector holder 102 is placed on the receptacle body 42, said plug-in connector holder having, for example, a foot element 104 which is connected to the outer face 74 of the sleeve wall 84, as shown in FIG. 9.

As shown in FIGS. 2 to 4 and 6 to 8, mounted on the plug-in connector holder 102 is a plug-in connector unit 106, for example, a socket which in the operating position A of the receptacle body 42 is thus arranged on a side of the receptacle body 42 facing away from a roadway 48 and, in the rest position R of the receptacle body 42 shown in FIGS. 7 and 8, lies on a side facing toward the roadway 48, but as before is covered by the bumper unit 16.

Furthermore, held on outer faces 108 of the sleeve walls 86 and 88 are mounting elements 112 of securing eyes 114 which serve to fix, for example, a contact-breaking cable of a braking device of a trailer or other safety elements.

Preferably, the mounting elements 112 are formed so that they allow a through hole 116 for creating a slot weld connection to the outer face 108 of the sleeve walls 86 and 88.

Figure 11:
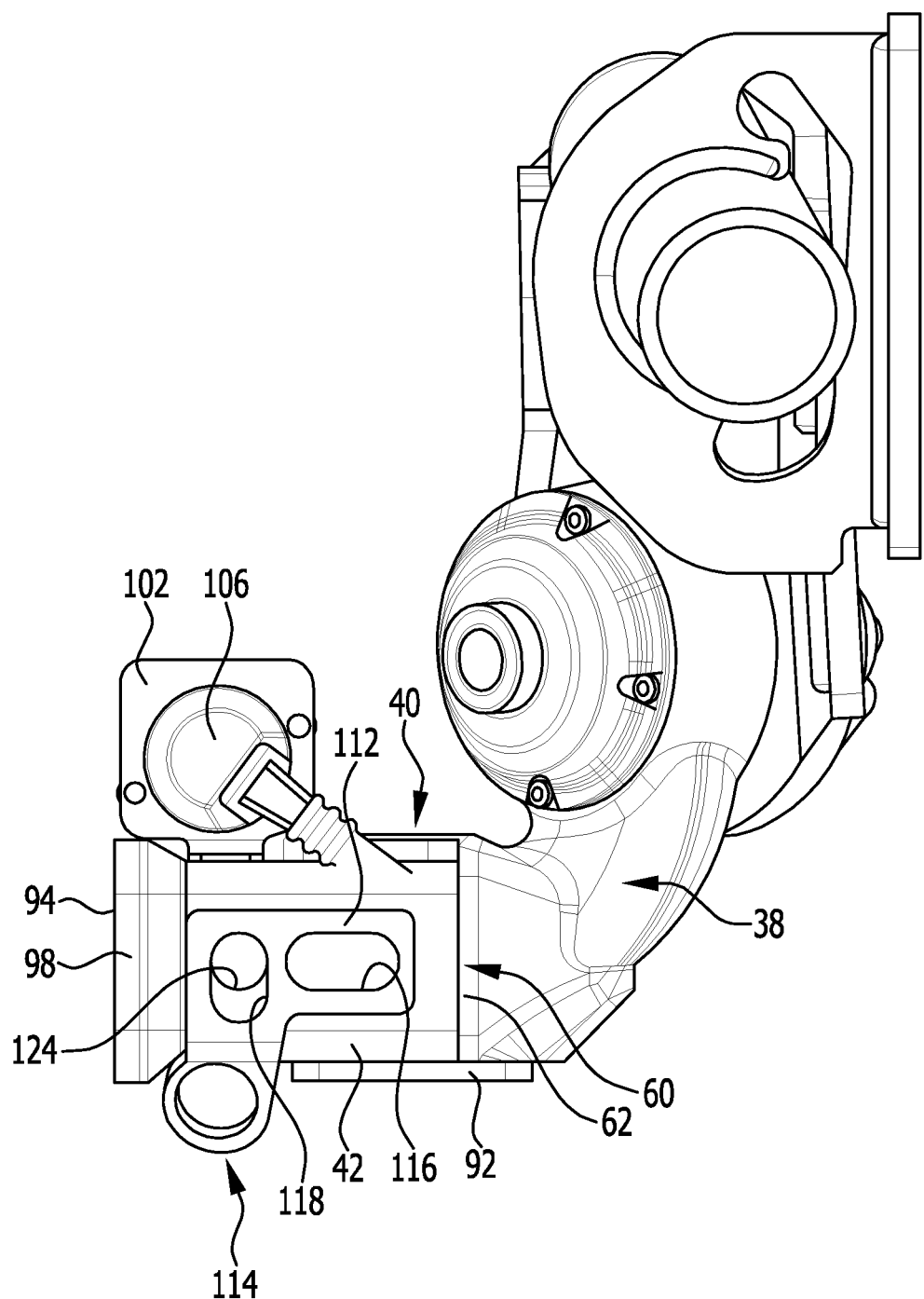
FIG. 11 shows a side view of the first exemplary embodiment of the holding device seen in the direction of the arrow A in FIG. 3.

Furthermore, the mounting elements 112 are also provided with holes 118 which, as shown in FIG. 11, lie on the sleeve walls 86, 88 so that openings 122 and 124 provided in the sleeve walls 86 and 88 are freely accessible, in particular, the holes 118 are dimensioned so that they form an edge reinforcement for the openings 122 and 124.

With the end region 56 of the coupling ball carrier 54 inserted into the plug-in receptacle 46, this end region 56 abuts an inside of all the sleeve walls 82, 84, 86 and 88 and is thus securely fixed in the plug-in receptacle 46 by the receptacle body 42 against movements transversely to the central axis 44.

Figure 12:
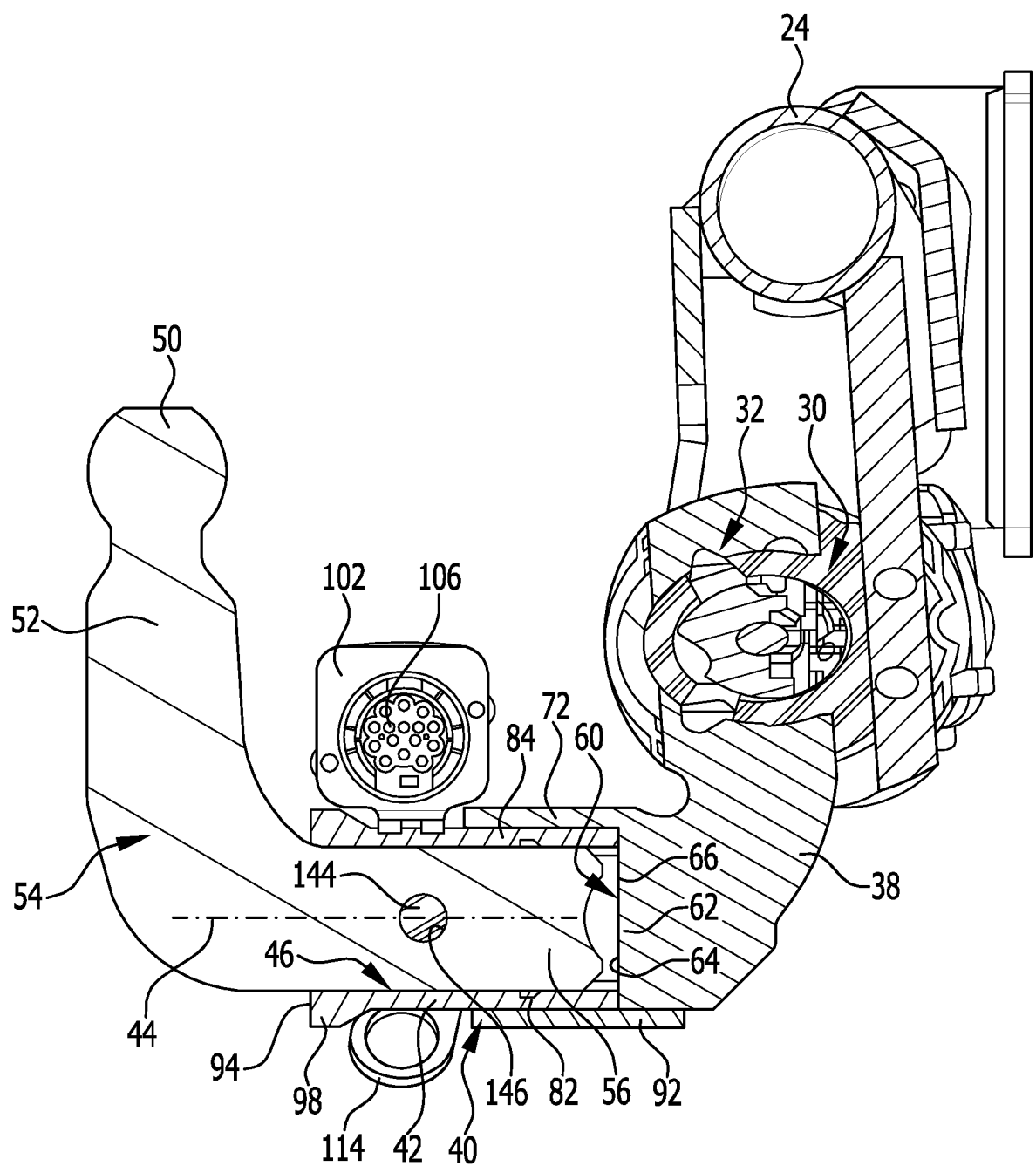
FIG. 12 shows a section along the line 12-12 in FIG. 5.
Figure 13:
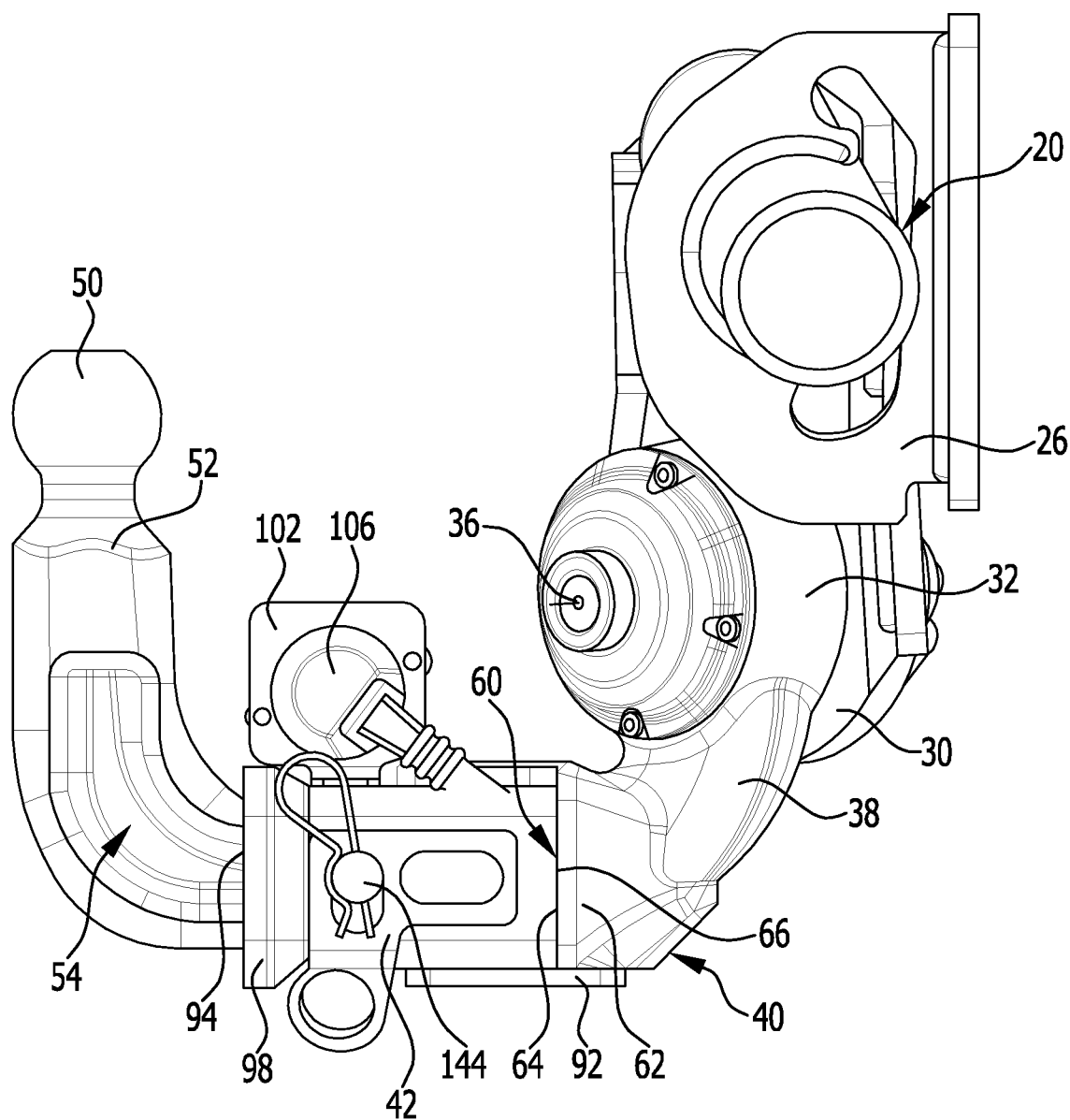
FIG. 13 shows a side view of the first exemplary embodiment similar to FIG. 11 with the coupling ball carrier inserted into the plug-in receptacle, and the coupling ball.

Furthermore, a securing of the end region 56 against a movement in the direction of the central axis 44 takes place by means of a locking pin 144 as shown in FIG. 12 which passes through the openings 122 and 124 in the sleeve walls 86 and 88 of the receptacle body 42 and also a corresponding hole 146 in the end region 56 of the coupling ball carrier 54 and is itself also secured against sliding out of the openings.

Figure 14:
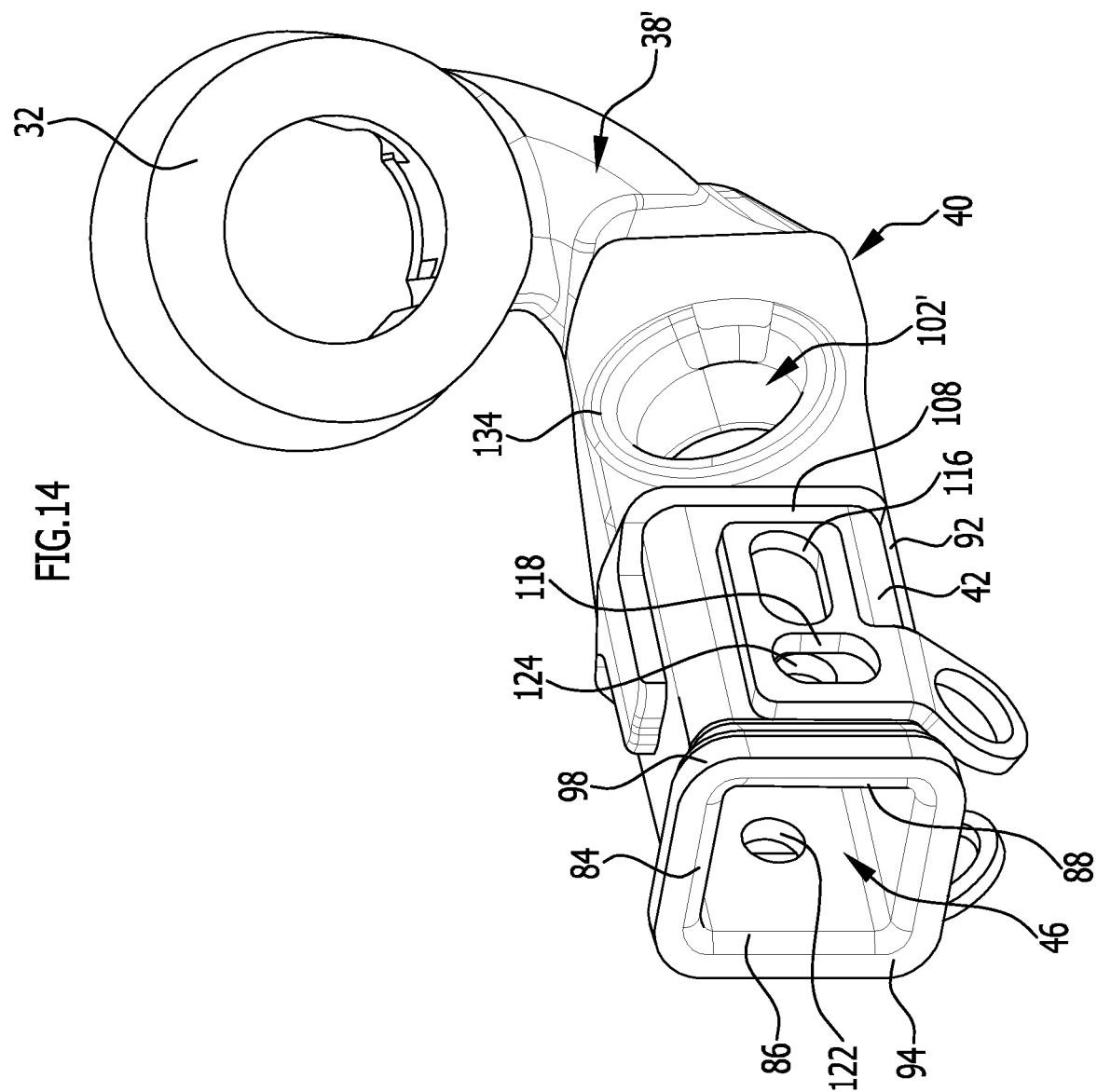
FIG. 14 shows a representation similar to FIG. 9 of a second exemplary embodiment of a holding device according to the invention.

In a second exemplary embodiment of the holding device according to the invention shown in FIG. 14, those elements which are identical to those of the first exemplary embodiment are provided with the same reference signs, so that with regard to the description, reference is made to the entire content of the description relating to the first exemplary embodiment.

In contrast to the first exemplary embodiment, in the second exemplary embodiment, the plug-in connector holder 102' is configured integrated into the connecting arm 38' in the form of an annular body portion 134 of the connecting arm 38', in which the plug-in connector unit 106 is inserted and is thereby held.

Figure 15:
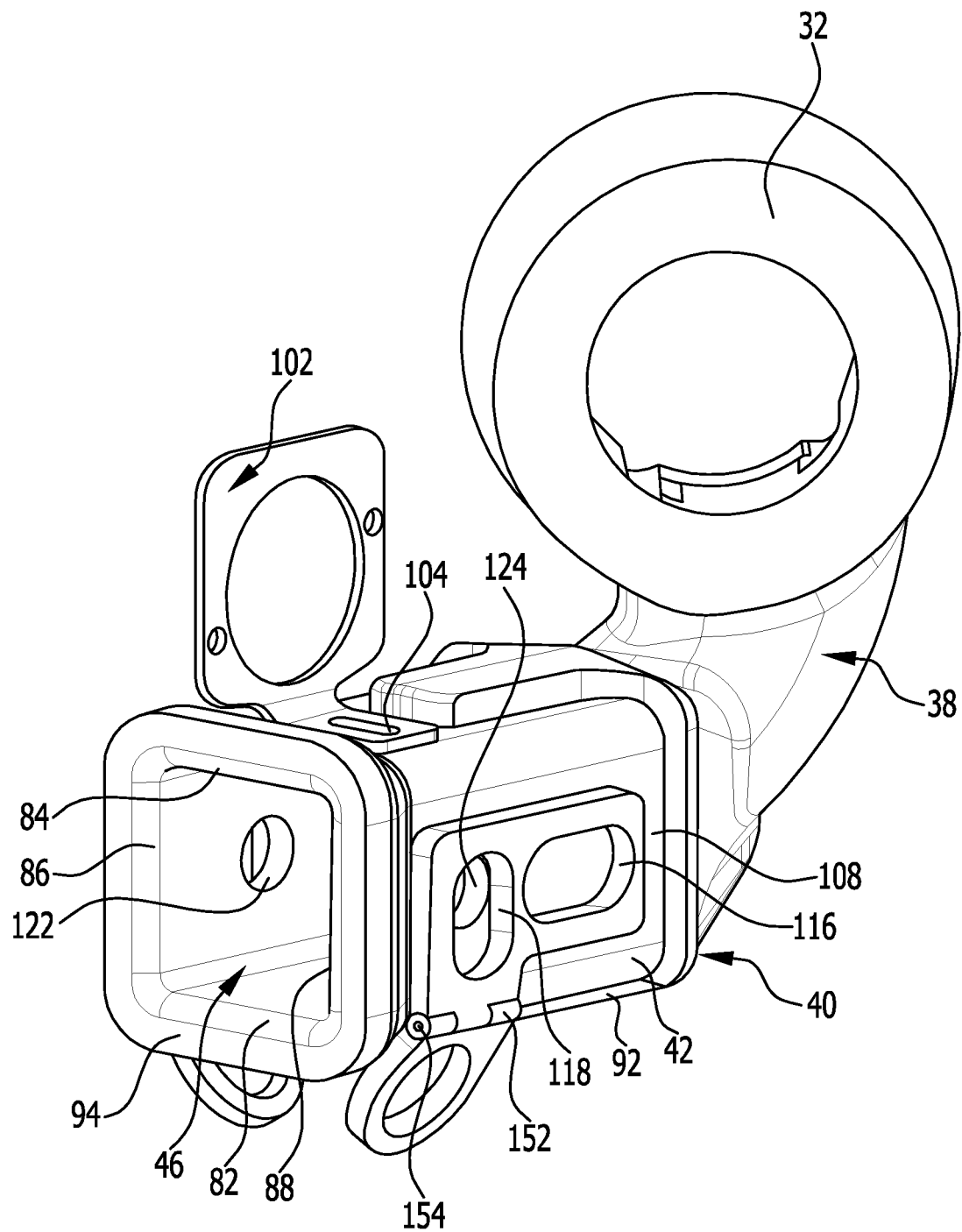
FIG. 15 shows a representation similar to FIG. 9 of a third exemplary embodiment of a holding device according to the invention.

In a third exemplary embodiment of the holding device according to the invention shown in FIG. 15, those elements which are identical to those of the first exemplary embodiment are provided with the same reference signs, so that with regard to the description, reference is made to the entire content of the description relating to the first exemplary embodiment.

In contrast to the above exemplary embodiments, in the third exemplary embodiment, the securing eyes 114 are connected by means of joints 152 to the attachment element carrier 40, for example, by means of a uniaxial joint 152 between the respective securing eye 114 and the mounting element 114, the articulation axis 154 of which extends approximately parallel to the longitudinal central plane 34.

The invention claimed is:

1. A holding device which is mountable on a tail region of the bodywork of a motor vehicle, comprising a swivel bearing unit which is mountable fixed to the vehicle on the tail region of a motor vehicle, by means of a support unit, on which swivel bearing unit a swivel element supporting an attachment element is mounted pivotable about a swivel axis extending transversely, relative to a longitudinal central plane and is thereby pivotable from an operating position into a rest position and vice versa, the swivel element is provided with an attachment element carrier having a plug-in receptacle, into which plug-in receptacle a attachment element is pluggable with an end region and is fixable with positive engagement, and in the operating position, the plug-in receptacle extends with its central axis substantially parallel to the longitudinal central plane and, in the rest position, extends with its central axis transversely to the longitudinal central plane, wherein the attachment element carrier comprises a receptacle body which has the plug-in receptacle, wherein the receptacle body is connected by means of a single connecting arm to the swivel element with the single connecting arm starting and extending outwardly from the swivel element and at its end opposite to the swivel element is provided with a holding seat arranged on the single connecting arm, the holding seat being connected to the receptacle body, wherein the holding seat abuts the receptacle body with a front face.

2. The holding device according to claim 1, wherein the holding seat has a support finger which abuts an outer face of the receptacle body and which is connected to the receptacle body.

3. The holding device of claim 1,
wherein the attachment element carrier is provided with a plug-in connector holder with an electric plug-in connector mounted on the plug-in connector holder.

4. The holding device according to claim 3, wherein the plug-in connector holder is arranged on the receptacle body.

5. The holding device according to claim 3, wherein the plug-in connector holder is arranged on the single connecting arm that connects the receptacle body to the swivel element.

6. The holding device according to claim 3, wherein the plug-in connector holder is integrated into the attachment element carrier.

7. The holding device according to claim 3, wherein the plug-in connector holder is arranged on a side of the attachment element carrier not facing toward the roadway, in the operating position of the attachment element carrier.

8. The holding device according to claim 3, wherein the plug-in connector holder is arranged on a side of the attachment element carrier facing away from the roadway, in the operating position.

9. The holding device according to claim 3, wherein in the rest position, the plug-in connector holder faces toward the roadway and in the operating position is arranged facing away from the roadway.

10. The holding device according to claim 1, wherein at least one securing eye is arranged on the attachment element carrier.

11. The holding device according to claim 10, wherein the at least one securing eye is connected to the attachment element carrier by means of a mounting element.

12. The holding device according to claim 11 wherein the mounting element is held on an outer face of the attachment element carrier.

13. The holding device according to claim 12, wherein the mounting element is arranged on an outer face of the attachment element carrier extending, in the operating position of the attachment element carrier, approximately parallel to the vehicle longitudinal central plane.

14. The holding device according to claim 13, wherein the at least one securing eye is connected in articulated manner to the attachment element carrier.

15. The holding device according to claim 1, wherein the support unit has a transverse support extending transversely to the longitudinal central plane which is connectable at outer end regions to the tail region of the bodywork and carries the swivel bearing unit in a central region.

16. The holding device according to claim 15, wherein in the rest position, the receptacle body abuts a side of the transverse support facing toward the roadway.

17. A motor vehicle having a bodywork, wherein the holding device according to claim 1 is arranged on the tail region.

18. The motor vehicle according to claim 17, wherein arranged on the tail region is a rear end bumper unit which overlaps the support unit.

19. The motor vehicle according to claim 18, wherein in the operating position, the attachment element carrier is arranged on a side of a lower edge of the bumper unit of the motor vehicle facing toward a roadway.

20. The motor vehicle according to claim 18, wherein in the rest position, the attachment element carrier is arranged on a side of the lower edge of the bumper unit facing away from a roadway and is hidden from view by the bumper unit.

21. The motor vehicle according to claim 18, wherein in the rest position, the plug-in receptacle is arranged on a side of the lower edge of the bumper unit facing away from the roadway.

22. The holding device of claim 1, wherein the plug-in receptacle is configured to receive a coupling ball carrier carrying a coupling ball at one end with the coupling ball carrier being insertable with an end region opposed to the coupling ball into the plug-in receptacle.

23. The holding device of claim 1, wherein the plug-in receptacle defines a rectangular receptacle opening for receiving a coupling ball carrier carrying a coupling ball.

24. A holding device which is mountable on a tail region of the bodywork of a motor vehicle, comprising a swivel bearing unit which is mountable fixed to the vehicle on the tail region of a motor vehicle, by means of a support unit, on which swivel bearing unit a swivel element supporting an attachment element is mounted pivotable about a swivel axis extending transversely, relative to a longitudinal central plane and is thereby pivotable from an operating position into a rest position and vice versa, the swivel element is provided with an attachment element carrier having a plug-in receptacle, into which plug-in receptacle an attachment element is pluggable with an end region and is fixable with positive engagement, and in the operating position, the receptacle extends with its central axis substantially parallel to the longitudinal central plane and, in the rest position, extends with its central axis transversely to the longitudinal central plane, wherein the attachment element carrier comprises a single bent connecting arm starting from the swivel element to which the single bent connecting arm is connected and carrying a receptacle body with the plug-in receptacle arranged at an end of the single bent connecting arm and the receptacle body with the plug-in receptacle extending in the manner of an extension of the single bent connecting arm.

25. The holding device according to claim 24, wherein the attachment element carrier is provided with a plug-in connector holder for receiving an electric plug-in connector, and the plug-in connector holder is arranged on the attachment element carrier.

26. The holding device according to claim 25, wherein the plug-in connector holder is arranged on the receptacle body.

27. The holding device according to claim 25, wherein the plug-in connector holder is arranged on the single bent connecting arm.

28. The holding device according to claim 25, wherein the plug-in connector holder is integrated into the attachment element carrier.

29. The holding device according to claim 25, wherein the plug-in connector holder is arranged on a side of the attachment element carrier not facing toward the roadway, in the operating position of the attachment element carrier.

30. The holding device according to claim 25, wherein the plug-in connector holder is arranged on a side of the attachment element carrier facing away from the roadway, in the operating position.

31. The holding device according to claim 25, wherein in the rest position, the plug-in connector holder faces toward the roadway and in the operating position is arranged facing away from the roadway.

32. The holding device according to claim 25, wherein in the rest position, the receptacle body extends along a side of the transverse support facing toward the roadway.

* * * * *

UNITED STATES PATENT AND TRADEMARK OFFICE
CERTIFICATE OF CORRECTION

| | | |
|---|---|---|
| PATENT NO. | : 11,179,984 B2 | Page 1 of 1 |
| APPLICATION NO. | : 15/969201 | |
| DATED | : November 23, 2021 | |
| INVENTOR(S) | : Wolfgang Gentner et al. | |

It is certified that error appears in the above-identified patent and that said Letters Patent is hereby corrected as shown below:

In the Claims

Column 10, Claim 24, Line 1, delete "ment, and in the operating position, the receptacle" and insert --ment, and in the operating position, the plug-in receptable--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*